Nov. 12, 1935.  C. MacCALLUM  2,020,366
VARIABLE PITCH PROPELLER
Filed Aug. 8, 1934   2 Sheets-Sheet 1
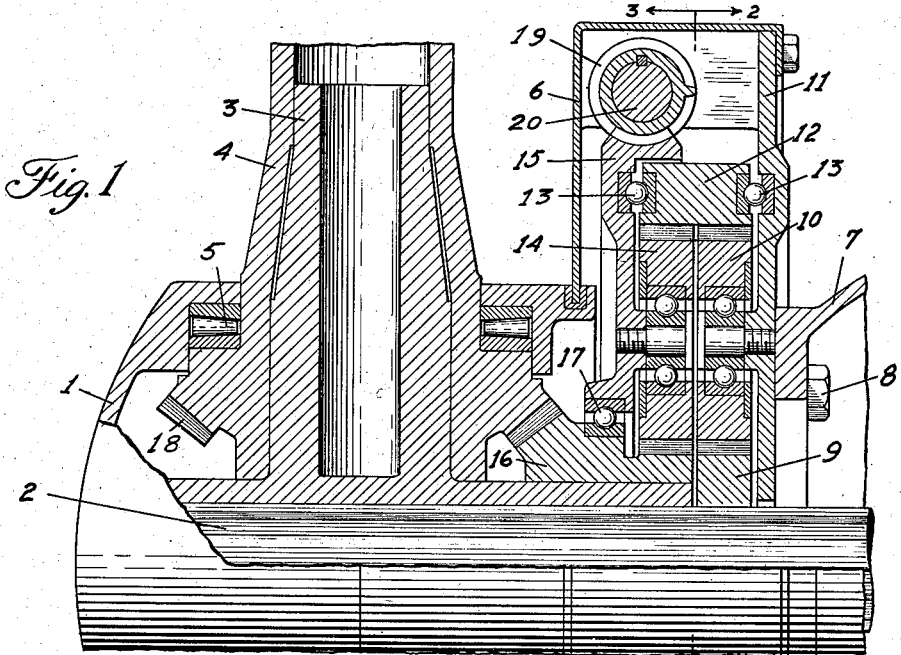
Fig. 1
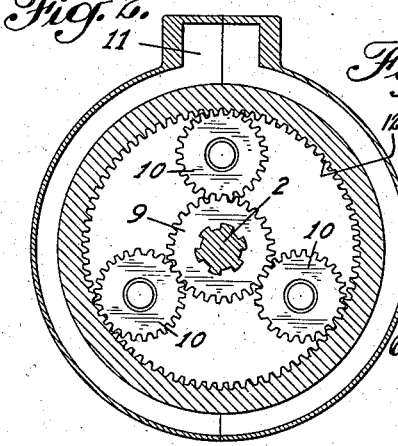
Fig. 2
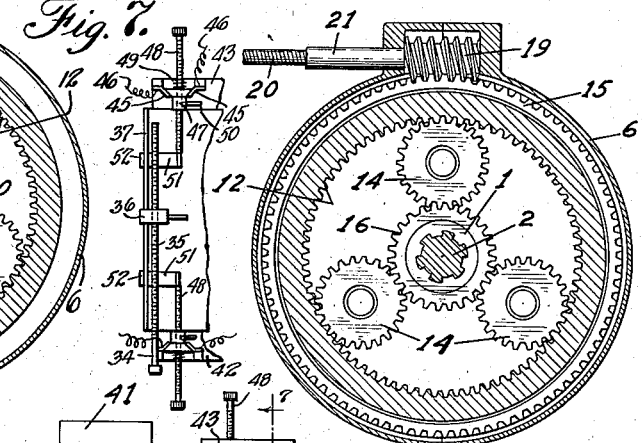
Fig. 3
Fig. 6
INVENTOR—
Clarence MacCallum
BY
D. Malcolm
ATTORNEY—

Nov. 12, 1935.  C. MacCALLUM  2,020,366
VARIABLE PITCH PROPELLER
Filed Aug. 8, 1934  2 Sheets-Sheet 2
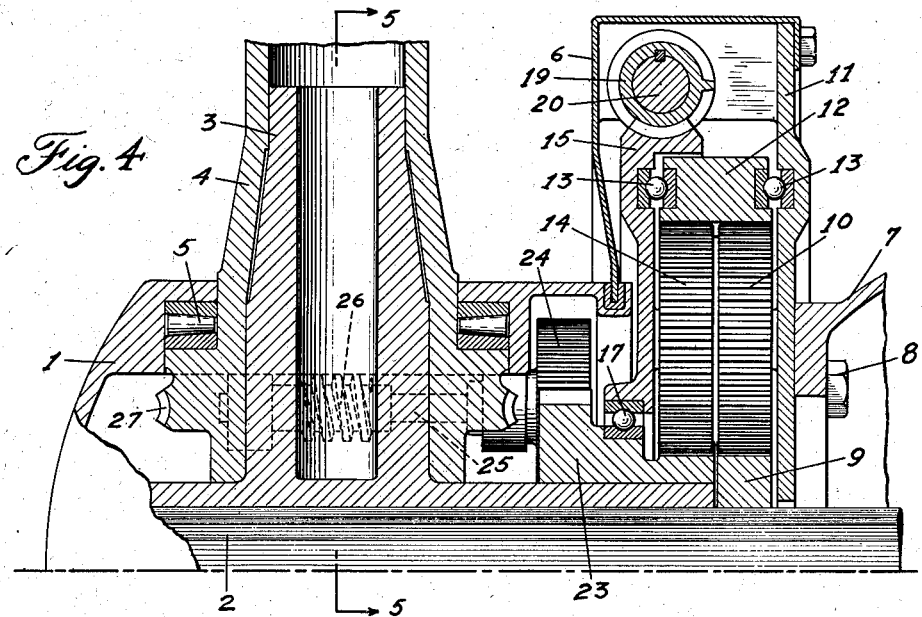
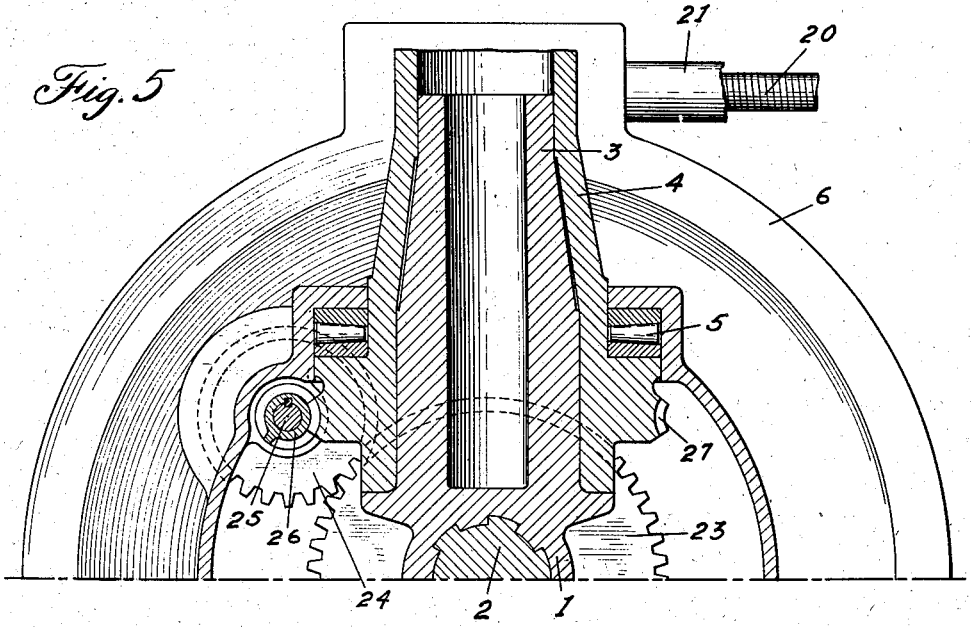
INVENTOR-
Clarence MacCallum
BY
D. Malcolm
ATTORNEY- Patented Nov. 12, 1935

2,020,366

UNITED STATES PATENT OFFICE 2,020,366

VARIABLE PITCH PROPELLER

Clarence MacCallum, Port Washington, N. Y.

Application August 8, 1934, Serial No. 738,899

12 Claims. (Cl. 170—163)

This invention relates to adjustable airplane propellers and has for its object to provide a simple and efficient mechanism for varying the pitch of a propeller by turning the blades about their longitudinal axes.

Another object of the invention is to provide an improved mechanism for adjusting the pitch of a propeller, either manually or by motor power, to any fractional part of a degree or to any prearranged limiting position so as to provide maximum effective power under varying conditions of load, engine speed, air density, etc., or to act as a brake in landing a plane.

Further objects of the invention are to enable the foregoing adjustments in the pitch of a propeller to be made with extreme accuracy from the cockpit of a plane, with the engine either stopped or running at high or low speed, and to provide indicating means in the cockpit to show the pilot the exact position of the blades at all times.

My adjusting mechanism preferably comprises an epicyclic gear system having a floating gear controlled by a worm and worm gear for varying the pitch of the propeller blades, the worm and worm gear also acting as a lock holding the blades at any pitch to which they may be set, although additional locking means may be provided if desired. The gear system acts positively and with very little friction when not being adjusted and is furthermore so compact as to preclude any possibility of interfering with the cooling air of the engine. Another feature of the invention resides in the provision of a novel pitch control mechanism which may be operated interchangeably by hand or by motor from the cockpit of a plane as hereinafter described.

My mechanism and method of controlling the pitch of the propeller or propellers of an airplane are useful in enabling the pilot to adjust the pitch for the most efficient takeoff and to make subsequent adjustments to suit cruising conditions or for high altitude flight. The reversibility of the mechanism is useful in permitting quick stopping of the plane when alighting on a small landing space. The remote control mechanism furthermore permits of easy dial registration in the cockpit of a plane, enabling the exact angle of the blades to be determined at a glance.

These and other features and advantages of the invention will be described in connection with the accompanying drawings, in which:

Fig. 1 is a vertical section through a propeller hub having a blade adjusting mechanism embodying my invention;

Figs. 2 and 3 are reduced vertical sectional views taken on lines 2—2 and 3—3, respectively, of Fig. 1;

Fig. 4 is a view similar to Fig. 1, showing a modification of the invention;

Fig. 5 is a vertical sectional view taken on line 5—5 of Fig. 4;

Fig. 6 is a diagrammatic view of the control and indicating mechanism, which is preferably located in the cockpit; and Fig. 7 is a broken vertical section taken on line 7—7 of Fig. 6.

In Figs. 1 to 3, the hub 1 supporting the propeller blades is fixed to the end of the driving shaft 2 in any suitable manner. The hub has two or more spindles 3 supporting the propeller blades 4 which are adapted to rotate on thrust bearings 5 housed between cooperating flanges 20 on hub 1 and propeller blades 4 as shown in Fig. 1.

The gear mechanism is preferably housed in an oil case 6 which is secured to the fuselage 7 as by bolts 8. The gear system includes gear 9 which is keyed to shaft 2 and drives idler gears 10 mounted on ball bearings on stationary plate 11 forming the rear wall of the housing 6. Gears 10 drive a double internal ring gear 12 having guide bearings 13, and ring gear 12, in turn, drives idler gears 14 which are mounted on the inner face of movable worm gear 15 and are of the same diameter and pitch as gears 10. Gears 14 drive double faced floating gear 16 which is loosely mounted on the sleeve portion of hub 1 surrounding engine shaft 2 and is provided with thrust bearing 17, while gear 16, in turn, drives segment gears 18 on the respective propeller blades 4. The portion of gear 16 meshing with gears 14 is of the same diameter and pitch as gear 9.

Gear 9 drives gear 16 in the same direction and at the same speed as shaft 2, through gears 10, 12 and 14, when worm gear 15 is held stationary. Rotation of worm gear 15, as by means of worm 19, causes angular displacement of idler gears 14 thereby increasing or decreasing the speed of gear 16 with relation to the engine shaft. Such increase or decrease in the speed of gear 16 causes proportional rotation of gears 18 on the propeller blades 4, thereby causing said blades to rotate about their axes to vary their pitch. Worm 19 may be operated by a flexible or other suitable shaft 20 housed in cable 21 and controlled from the cockpit of the plane as hereinafter described.

The blade adjusting mechanism of Figs. 4 and 5 is similar to that shown in Figs. 1 to 3 except that a double faced spur gear 23 replaces gear 16 and drives a plurality of spur gears 24 which are keyed to shafts 25 journaled in hub 1 adjacent the respective propeller blades. The shafts 25 carry worms 26 meshing with worm gears 27 which are carried by the respective propeller blades 4. The adjustment of the blades is effected by rotating worm 19 and worm gear 15 as in Figs. 1 to 3. In the form shown in Figs. 4 and 5, a change in the speed of gear 23 causes proportional rotation of gears 24 and worms 26 thereby rotating worm gears 27 and propeller blades 4 to vary the pitch of said blades.

Either of the above described adjusting mechanisms may be operated from the cockpit of an airplane by means of the control mechanism illustrated in Figs. 6 and 7. In this embodiment of the invention the control shaft 20 operating worm 19 terminates in a handwheel 29 which is conveniently located in the cockpit of the plane. Handwheel 29 carries a gear 30 which meshes with gear 31 on the shaft of reversible electric motor 32. Gear 31, in turn, meshes with gear 33 which is secured to one end of a flexible shaft 34 as shown in Fig. 6. The other end of shaft 34 is secured to a rotatable screw 35 carrying the longitudinally movable pointer 36 of pitch indiactor 37. Rotation of handwheel 29 causes rotation of shaft 20 and consequent angular adjustment of the propeller blades, as previously described, and at the same time causes rotation of flexible shaft 34 and consequent adjustment of pointer 36 giving the pilot an instantaneous accurate indication of the position of the blades.

Motor 32 may be used interchangeably with handwheel 29 although the handwheel is preferred for making relatively small adjustments while the motor is particularly well suited for making relatively large adjustments such as shifting the propeller blades to maximum limiting positions in either direction. The motor control circuit includes a suitable double throw switch 39, electrical contactors 40 and 41, and adjustable limit switches 42 and 43. Operation of switch 39 causes the operation of either contactor 40 or 41 thereby operating motor 32 in either a forward or reverse direction according to the direction in which the switch 39 is thrown. Operation of motor 32 causes rotation of gear 30, shaft 20 and worm 19, thereby operating the train of gears which adjust the angular position of the propeller blades as previously described. At the same time motor 32 rotates gear 33 and flexible shaft 34, thereby turning screw 35 which moves pointer 36 longitudinally of indicator 37. When pointer 36 reaches a predetermined point corresponding to a definite propeller pitch it operates one or the other of the limit switches 42 or 43, depending upon the direction of movement of pointer 36, it being understood that switches 42 and 43 are adjusted beforehand to operate at the point at which it is desired to arrest the angular adjustment of the propeller blades. Operation of switch 42 causes the operation of of contactor 40, while operation of switch 43 causes the operation of contactor 41, either contactor operating to deenergize motor 32 and thereby stop the adjustment of the propeller blades at the maximum or limiting position corresponding to the setting of limit switch 42 or 43 as the case may be. If desired, limit switches 42 and 43 may be omitted and the motor 32 turned off as well as on by switch 39, or switch 39 may be used to stop the motor 32 at any desired intermediate position of the propeller blades and limit switches 42 and 43 retained as a safety measure to stop the motor at predetermined limiting positions of the blades. When very rapid reversal of the blades is desired, for example to act as a brake in stopping the plane in a small landing space, the ratio between gears 30, 31 and 33 may be such as to reverse the blades and stop the motor 32 in a few seconds, in which case it may be desirable to use motor 32 only for reversing purposes and to make the intermediate blade adjustments by hand.

The limit switches 42 and 43 may be adjusted in any suitable manner, for example by the mechanism illustrated in Fig. 7. In this particular mechanism each switch comprises a pair of contacts 45 which are connected by conductors 46 to the respective contactors 40 and 41, said conductors being contained in the cables illustrated in Fig. 6. The contacts 45 of each switch are normally connected by blocks 47 of carbon or other electrical conducting material, the circuits to the respective contactors 40 and 41 extending through said blocks 47 and said conductors 46. Blocks 47 are threaded on screws 48 which extend through the housings of switches 42 and 43 and are held in engagement with contacts 45 by coil springs 49 which are compressed between blocks 47 and the upper walls of the switch housings. Blocks 47 are held against rotation by feather keys 50 engaging vertical slots in said blocks, from which it will be seen that screws 48 may be rotated freely without rotating blocks 47 or moving them out of engagement with their respective contacts 45. At their inner ends screws 48 carry plates 51 secured thereto by suitable pins permitting screws 48 to rotate with respect to said plates 51 while causing the plates to move longitudinally of the indicator housing 37 when the screws are rotated. Plates 51 are in the path of the pointer mechanism 36 of indicator 37, hence when pointer 36 engages either plate 51 it will move said plate and its screw 48 against the tension of spring 49 thereby moving block 47 out of engagement with its contacts 45. This breaks the circuit to contactor 40 or 41, as the case may be, thereby deenergizing motor 32 and arresting the adjustment of the propeller blades as previously described. It is thus evident that by simply turning screws 48 the limit switches 42 and 43 may be adjusted to operate at any point at which it is desired to arrest the angular adjustment of the propeller blades. Plates 51 carry pointers 52 which indicate the setting of said plates on the front panel of pitch indicator 37.

Since the epicyclic gear system of Figs. 1 to 5 has relatively few moving parts, and since there is no centrifugal motion of gears 10, 14 or 15 except for such rotation of gear 15 as is required to adjust the pitch of the propeller blades, friction and centrifugal distortion components are reduced to a minimum thereby increasing the accuracy, sensitivity and durability of the mechanism and making it easy to adjust by hand or motor power. Since worm gear 15 and worm 19 are normally stationary they act as a positive lock holding the propeller blades at any pitch to which they may be adjusted. An additional lock is also provided by the worms 26 and worm gears 27 of Figs. 4 and 5. The motor 32 and associated handwheel 29 of Fig. 6 likewise offer additional inertia which further tends to hold shaft 20 and worm 19 against accidental rotation. Hence the only chance of even slight loss or slippage between the propeller blades and the control mechanism lies in the possibility of backlash which is reduced to a minimum by the simplicity of my system and may be eliminated by proper gear design.

Various changes may be made in the details of construction and methods of operation described above without departing from the scope and spirit of the invention as defined in the appended claims.

The invention claimed is:

1. The combination with an airplane driving shaft, of a propeller hub driven thereby, a set of blades carried by said hub and arranged to rotate about their longitudinal axes, means including a manual control for rotating said blades about their longitudinal axes, a reversible motor geared to said control, and means for operating said motor to actuate said control.

2. The combination with an airplane driving shaft, of a propeller hub driven thereby, a set of blades carried by said hub and arranged to rotate about their longitudinal axes, means including a manual control for rotating said blades about their longitudinal axes, a reversible motor geared to said control, means for operating said motor to actuate said control, an indicator actuated by said control, and means controlled by said indicator for stopping said motor.

3. The combination with an airplane driving shaft, of a propeller hub driven thereby, a set of blades carried by said hub and arranged to rotate about their longitudinal axes, means including a normally stationary worm gear for rotating said blades about their longitudinal axes, a worm for actuating said worm gear, a handwheel for actuating said worm, a reversible motor geared to said handwheel, and means for operating said motor to actuate said worm and worm gear.

4. The combination with an airplane driving shaft, of a propeller hub driven thereby, a set of blades carried by said hub and arranged to rotate about their longitudinal axes, means including a normally stationary worm gear for rotating said blades about their longitudinal axes, a worm for actuating said worm gear, a handwheel for actuating said worm, a reversible motor geared to said handwheel, means for operating said motor to actuate said worm and worm gear, an indicator actuated by said handwheel and motor, and means controlled by said indicator for stopping said motor.

5. The combination with an airplane driving shaft, of a propeller hub driven thereby, a set of blades carried by said hub and arranged to rotate about their longitudinal axes, a floating gear on said driving shaft, means for rotating said floating gear in the same direction and at the same speed as said driving shaft, means including a normally stationary worm gear adapted when rotated to vary the speed of said floating gear with respect to said driving shaft, a worm for actuating said worm gear, a handwheel for actuating said worm, a reversible motor geared to said handwheel, means for operating said motor to actuate said worm and worm gear, and means responsive to differential rotation of said floating gear to rotate said propeller blades about their longitudinal axes.

6. The combination with an airplane driving shaft, of a propeller hub driven thereby, a set of blades carried by said hub and arranged to rotate about their longitudinal axes, a floating gear on said driving shaft, means for rotating said floating gear in the same direction and at the same speed as said driving shaft, means including a normally stationary worm gear adapted when rotated to vary the speed of said floating gear with respect to said driving shaft, a worm for actuating said worm gear, a handwheel for actuating said worm, a reversible motor geared to said handwheel, means for operating said motor to actuate said worm and worm gear, an indicator actuated by said handwheel and motor, means controlled by said indicator for stopping said motor, and means responsive to differential rotation of said floating gear to rotate said propeller blades about their longitudinal axes.

7. The combination with an airplane driving shaft, of a propeller hub driven thereby, a set of blades carried by said hub and arranged to rotate about their longitudinal axes, a gear driven by said driving shaft, an idler gear driven by said shaft gear, a ring gear driven by said idler gear, a normally stationary worm gear adjacent said ring gear, a second idler gear carried by said worm gear and driven by said ring gear, means including a worm cooperating with said worm gear to rotate and lock said worm gear so as to displace said second idler gear, and means responsive to the displacement of said second idler gear to rotate said propeller blades about their longitudinal axes.

8. The combination with an airplane driving shaft, of a propeller hub driven thereby, a set of blades carried by said hub and arranged to rotate about their longitudinal axes, a gear driven by said driving shaft, an idler gear driven by said shaft gear, a ring gear driven by said idler gear, a normally stationary worm gear adjacent said ring gear, a second idler gear carried by said worm gear and driven by said ring gear, a floating gear on said driving shaft driven by said second idler gear in the same direction and at the same speed as said driving shaft, means for rotating and locking said normally stationary worm gear to cause differential rotation of said floating gear relative to said driving shaft, and means responsive to differential rotation of said floating gear to cause proportional rotation of said propeller blades about their longitudinal axes.

9. The combination with an airplane driving shaft, of a propeller hub driven thereby, a set of blades carried by said hub and arranged to rotate about their longitudinal axes, a gear driven by said driving shaft, a set of planetary idler gears having fixed centers and driven by said shaft gear, an internal ring gear driven by said idler gears, a normally stationary worm gear adjacent said ring gear, a second set of planetary idler gears carried by said worm gear and driven by said ring gear, a floating gear on said driving shaft driven by said second set of idler gears in the same direction and at the same speed as said driving shaft, means including a worm for rotating said normally stationary worm gear to cause differential rotation of said floating gear relative to said driving shaft, and means responsive to differential rotation of said floating gear to cause proportional rotation of said propeller blades about their longitudinal axes.

10. The combination with an airplane driving shaft, of a propeller hub driven thereby, a set of blades carried by said hub and arranged to rotate about their longitudinal axes, gears carried by said blades for rotating same about said longitudinal axes, a gear driven by said driving shaft, a set of planetary idler gears having fixed centers and driven by said shaft gear, an internal ring gear driven by said idler gears, a normally stationary worm gear adjacent said ring gear, a second set of planetary idler gears carried by said worm gear and driven by said ring gear, a floating gear on said driving shaft driven by said second set of idler gears in the same direction and at the same speed as said driving shaft, means including a worm for rotating said normally stationary worm gear to cause differential rotation of said floating gear relative to said driving shaft, and means responsive to differential rotation of said floating gear to cause proportional rotation of said propeller blades about their longitudinal axes.

11. The combination with an airplane driving shaft, of a propeller hub driven thereby, a set of blades carried by said hub and arranged to rotate about their longitudinal axes, gears carried by said blades for rotating same about said longitudinal axes, a gear driven by said driving shaft, a set of planetary idler gears having fixed centers and driven by said shaft gear, a ring gear driven by said idler gears, a normally stationary worm gear adjacent said ring gear, a second set of planetary idler gears carried by said worm gear and driven by said ring gear, a floating gear on said driving shaft driven by said second set of idler gears in the same direction and at the same speed as said driving shaft and meshing with said blade gears, and means for rotating said normally stationary worm gear to vary the speed of said floating gear relative to said driving shaft so as to cause proportional rotation of said propeller blades about their longitudinal axes.

12. The combination with an airplane driving shaft, of a propeller hub driven thereby, a set of blades carried by said hub and arranged to rotate about their longitudinal axes, worm gears carried by said blades for rotating same about said longitudinal axes, worms carried by said hub for actuating said worm gears, a gear driven by said driving shaft, a set of planetary idler gears having fixed centers and driven by said shaft gear, an internal ring gear driven by said idler gears, a normally stationary worm gear adjacent said ring gear, a second set of planetary idler gears carried by said worm gear and driven by said ring gear, a floating gear on said driving shaft driven by said second set of idler gears in the same direction and at the same speed as said driving shaft, means controlled by said floating gear for actuating said blade worms and worm gears, and means including a worm for rotating and locking said normally stationary worm gear to vary the speed of said floating gear relative to said driving shaft so as to cause proportional rotation of said propeller blades about their longitudinal axes.

CLARENCE MacCALLUM.